US012593289B2

(12) United States Patent
Cui et al.

(10) Patent No.: US 12,593,289 B2
(45) Date of Patent: Mar. 31, 2026

(54) SYSTEMS AND METHODS FOR INDICATION OF VALID TIME

(71) Applicant: ZTE Corporation, Shenzhen (CN)

(72) Inventors: Fangyu Cui, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 316 days.

(21) Appl. No.: 18/361,263

(22) Filed: Jul. 28, 2023

(65) Prior Publication Data

US 2023/0388944 A1     Nov. 30, 2023

Related U.S. Application Data

(63) Continuation of application No. PCT/CN2021/105152, filed on Jul. 8, 2021.

(51) Int. Cl.
 *H04W 56/00* (2009.01)
 *H04J 3/06* (2006.01)

(52) U.S. Cl.
 CPC ........... *H04W 56/00* (2013.01); *H04J 3/0635* (2013.01); *H04W 56/001* (2013.01)

(58) Field of Classification Search
 CPC .......... H04J 3/06; H04J 3/0635; H04J 3/0638; H04W 56/00; H04W 56/001; H04W 56/0015; H04W 56/0045; H04W 56/0055; H04W 56/0065
 See application file for complete search history.

(56) References Cited

U.S. PATENT DOCUMENTS

| | | | | |
|---|---|---|---|---|
| 8,625,572 B2 * | 1/2014 | Wirola | .................... | G01S 19/05 |
| | | | | 455/12.1 |
| 8,711,036 B2 * | 4/2014 | Gaal | ....................... | G01S 19/25 |
| | | | | 342/357.64 |
| 8,781,507 B2 * | 7/2014 | Werner | .................. | H04W 64/00 |
| | | | | 455/67.11 |
| 8,937,939 B2 * | 1/2015 | Wirola | .................. | G01S 19/256 |
| | | | | 370/252 |
| 2018/0124659 A1 | 5/2018 | Lee et al. | | |
| 2020/0178135 A1 | 6/2020 | Yun et al. | | |

(Continued)

FOREIGN PATENT DOCUMENTS

| | | |
|---|---|---|
| CN | 112715023 A | 4/2021 |
| CN | 112771943 A | 5/2021 |

(Continued)

OTHER PUBLICATIONS

Thales, "Considerations on UL timing and frequency synchronization in NTN," 3GPP TSG RAN WGI Meeting #105-e, R1-2106112, e-Meeting, May 10-27, 2021 (21 pages).

(Continued)

*Primary Examiner* — Alpus Hsu
(74) *Attorney, Agent, or Firm* — Perkins Coie LLP

(57) ABSTRACT

Methods and systems for techniques for indicating a valid time period for assistance information in mobile communication technology are disclosed. In one example aspect, a wireless communication method includes receiving, by a wireless device, a set of parameters to indicate a validity of assistance information, wherein the assistance information is used to perform a synchronization for transmissions to the network device.

20 Claims, 7 Drawing Sheets

300

Receive, by a wireless device, a set of parameters to indicate a validity of assistance information, wherein the assistance information is used to perform a synchronization for transmissions from the wireless device to the network device.

310

(56)                    References Cited

U.S. PATENT DOCUMENTS

| | | | | |
|---|---|---|---|---|
| 2021/0136629 A1* | 5/2021 | Ioffe | .................. | H04W 28/0831 |
| 2021/0337598 A1* | 10/2021 | Ma | .................... | H04W 56/0045 |
| 2021/0345281 A1 | 11/2021 | Yang et al. | | |
| 2022/0046566 A1* | 2/2022 | Leng | ................. | H04W 56/0045 |
| 2022/0167315 A1* | 5/2022 | Park | ...................... | H04W 72/23 |
| 2022/0338150 A1 | 10/2022 | Zhang et al. | | |
| 2023/0068462 A1* | 3/2023 | Moon | ................. | H04W 56/001 |

FOREIGN PATENT DOCUMENTS

| | | | |
|---|---|---|---|
| WO | 2021033085 A1 | 2/2021 | |
| WO | 2021062680 A1 | 4/2021 | |

OTHER PUBLICATIONS

Extended European Search Report for European Patent Application No. 21948816.0, mailed May 6, 2024 (11 pages).

International Search Report and Written Opinion for International Patent Application No. PCT/CN2021/105152, mailed Mar. 30, 2022 (6 pages).

ZTE, "Discussion on UL synchronization for NR-NTN," 3GPP TSG RAN WG1 #105-e, R1-2105190, e-Meeting, May 10-27, 2021 (17 pages).

Nokia et al., "Discussion on time and frequency synchronization for NR over NTN," 3GPP TSG RAN WG1 #105, R1-2104828, e-Meeting, May 19-27, 2021 (13 pages).

Mediatek, "UE Time and frequency Synchronisation for NR-NTN Document for: Discussion and Decision," 3GPP TSG RAN WG1 Meeting #105-e, R1-2105952, e-Meeting, May 10-27, 2021 (18 pages).

Office Action for Japanese Patent Application No. 2024-163832, mailed Jul. 4, 2025 (6 pages).

* cited by examiner

Figure 3:
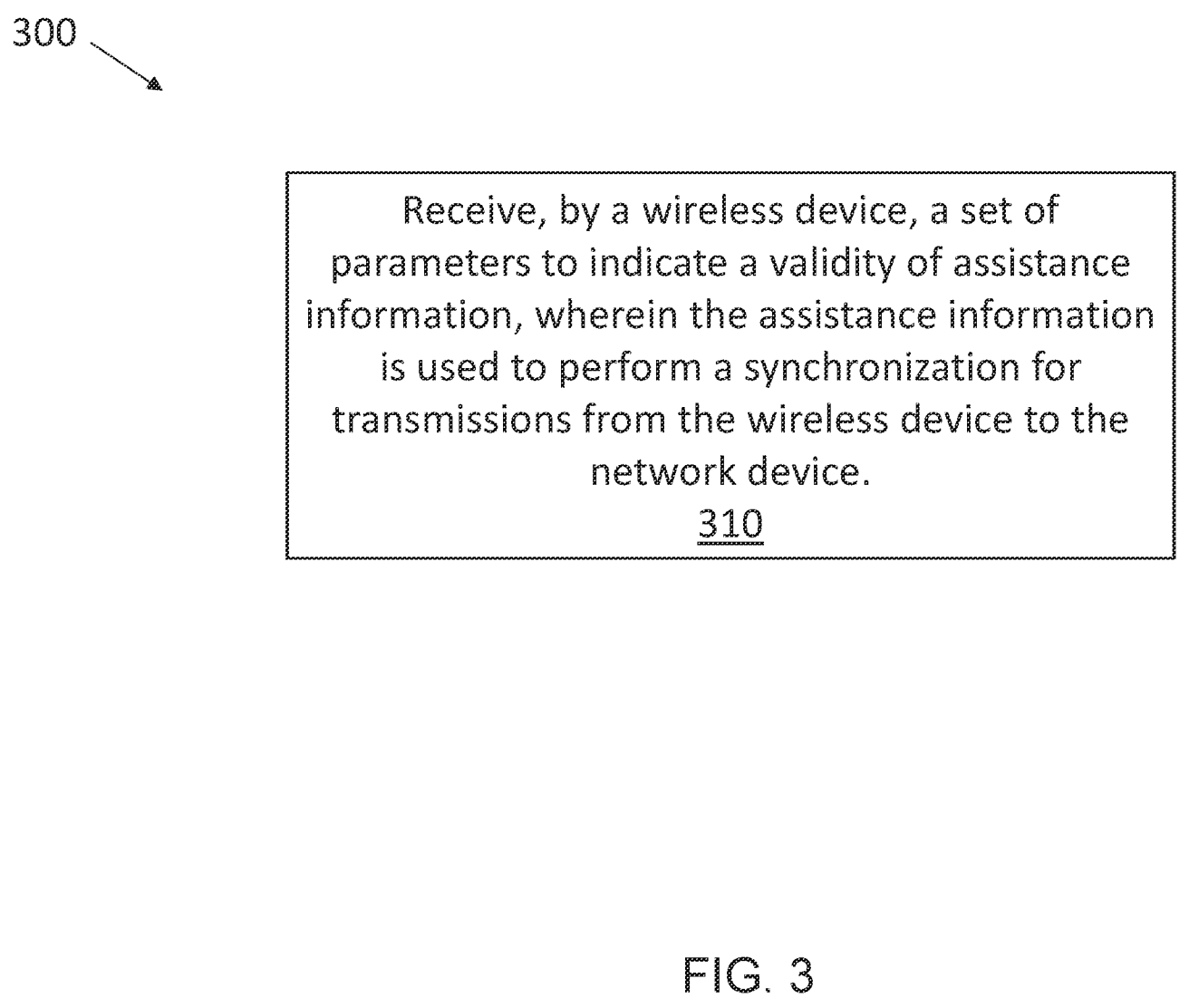

300

Receive, by a wireless device, a set of parameters to indicate a validity of assistance information, wherein the assistance information is used to perform a synchronization for transmissions from the wireless device to the network device.

Transmit, by a network device, a set of parameters to indicate a validity of assistance information, wherein the assistance information is used to perform a synchronization for transmissions to the network device

410

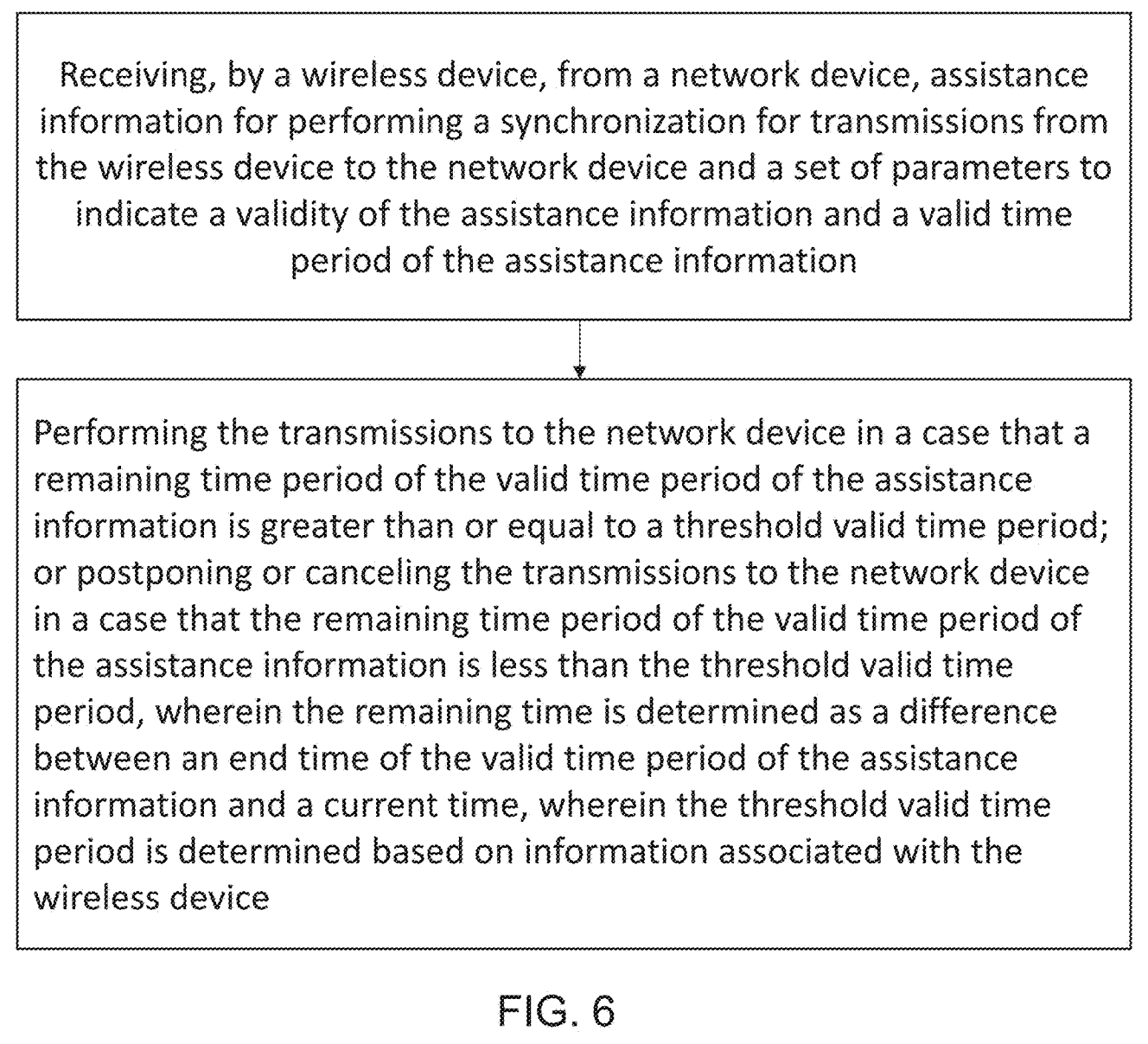

Receiving, by a wireless device, from a network device, assistance information for performing a synchronization for transmissions from the wireless device to the network device and a set of parameters to indicate a validity of the assistance information and a valid time period of the assistance information Performing the transmissions to the network device in a case that a remaining time period of the valid time period of the assistance information is greater than or equal to a threshold valid time period; or postponing or canceling the transmissions to the network device in a case that the remaining time period of the valid time period of the assistance information is less than the threshold valid time period, wherein the remaining time is determined as a difference between an end time of the valid time period of the assistance information and a current time, wherein the threshold valid time period is determined based on information associated with the wireless device

FIG. 6

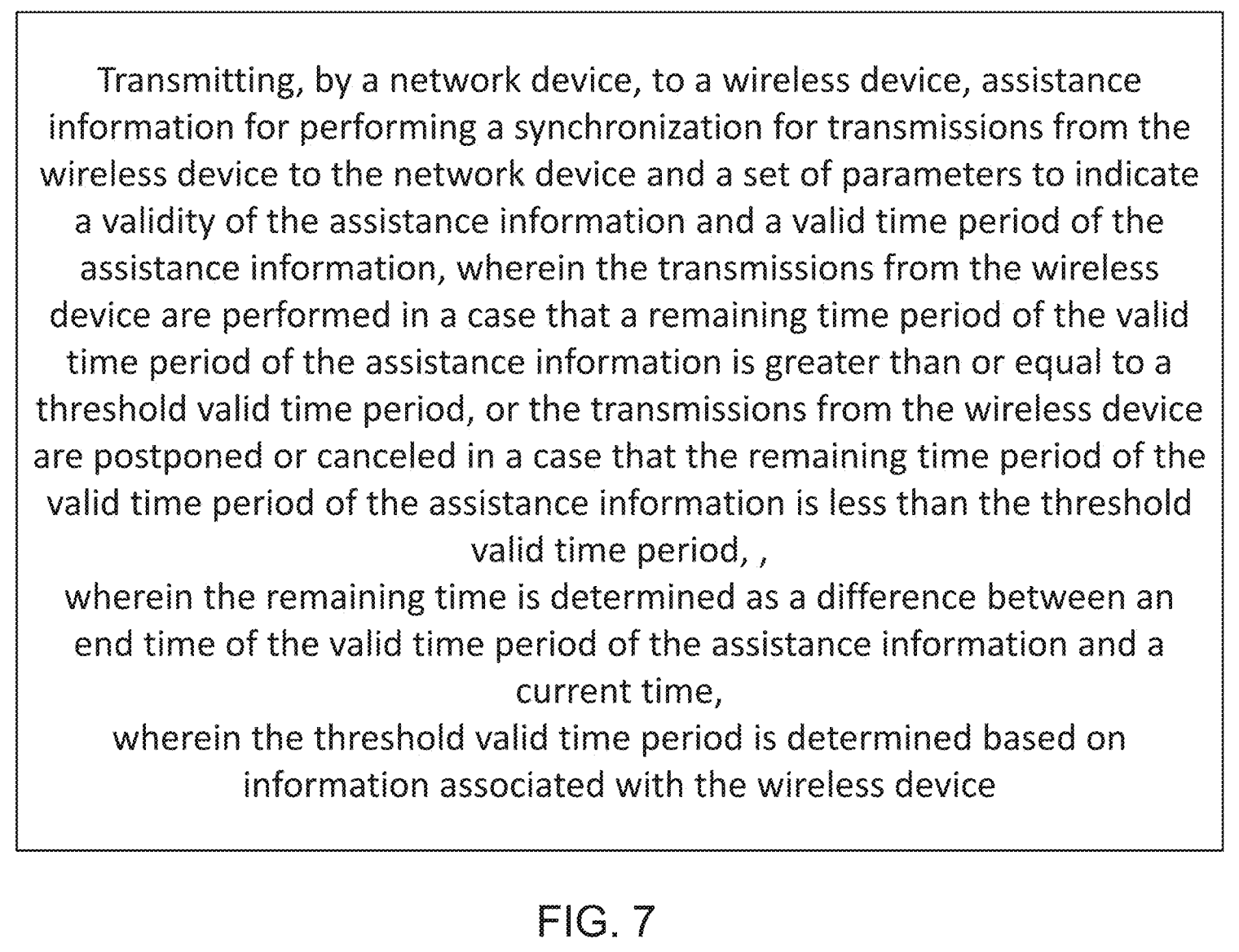

Transmitting, by a network device, to a wireless device, assistance information for performing a synchronization for transmissions from the wireless device to the network device and a set of parameters to indicate a validity of the assistance information and a valid time period of the assistance information, wherein the transmissions from the wireless device are performed in a case that a remaining time period of the valid time period of the assistance information is greater than or equal to a threshold valid time period, or the transmissions from the wireless device are postponed or canceled in a case that the remaining time period of the valid time period of the assistance information is less than the threshold valid time period, , wherein the remaining time is determined as a difference between an end time of the valid time period of the assistance information and a current time, wherein the threshold valid time period is determined based on information associated with the wireless device

FIG. 7

SYSTEMS AND METHODS FOR INDICATION OF VALID TIME

CROSS REFERENCE TO RELATED APPLICATIONS

This patent document is a continuation of and claims benefit of priority to International Patent Application No. PCT/CN2021/105152, filed on Jul. 8, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This document relates to methods, systems, and devices for indicating a valid time period for assistance information in mobile communication technology, including 5th Generation (5G), and new radio (NR) communication systems.

In one aspect, a method of data communication is disclosed. The method includes receiving, by a wireless device, a set of parameters to indicate a validity of assistance information, wherein the assistance information is used to perform a synchronization for transmissions from the wireless device to a network device.

In another aspect, a method of data communication is disclosed. The method includes transmitting, by a network device, a set of parameters to indicate a validity of assistance information, wherein the assistance information is used to perform a synchronization for transmissions to the network device.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWINGS

FIG. 3 shows an example of a wireless communication method based on some embodiments of the disclosed technology.
FIG. 6 shows an example of a wireless communication method based on some embodiments of the disclosed technology.
FIG. 7 shows another example of a wireless communication method based on some embodiments of the disclosed technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
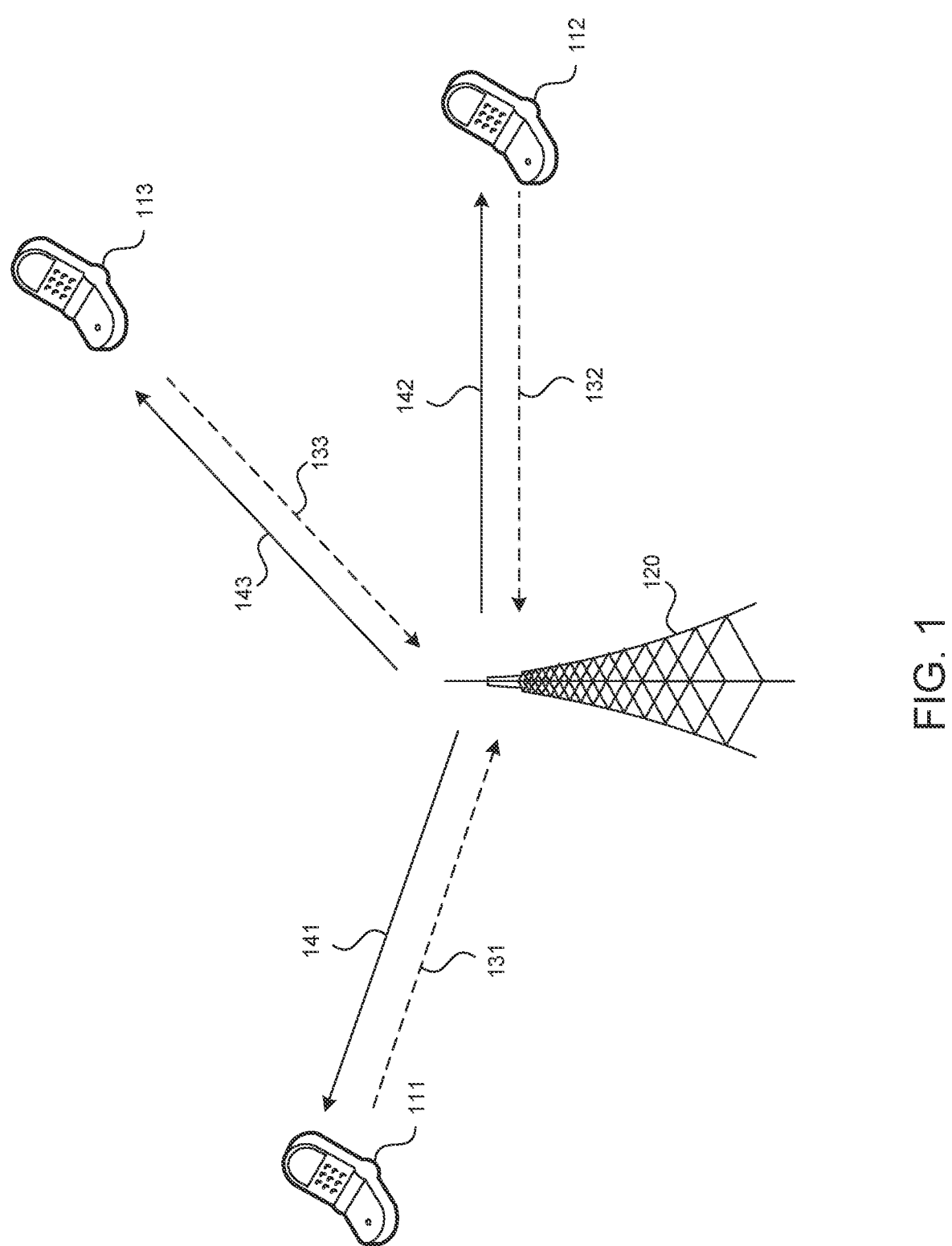
FIG. 1 shows an example of a base station (BS) and user equipment (UE) in wireless communication.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI (downlink control information) or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
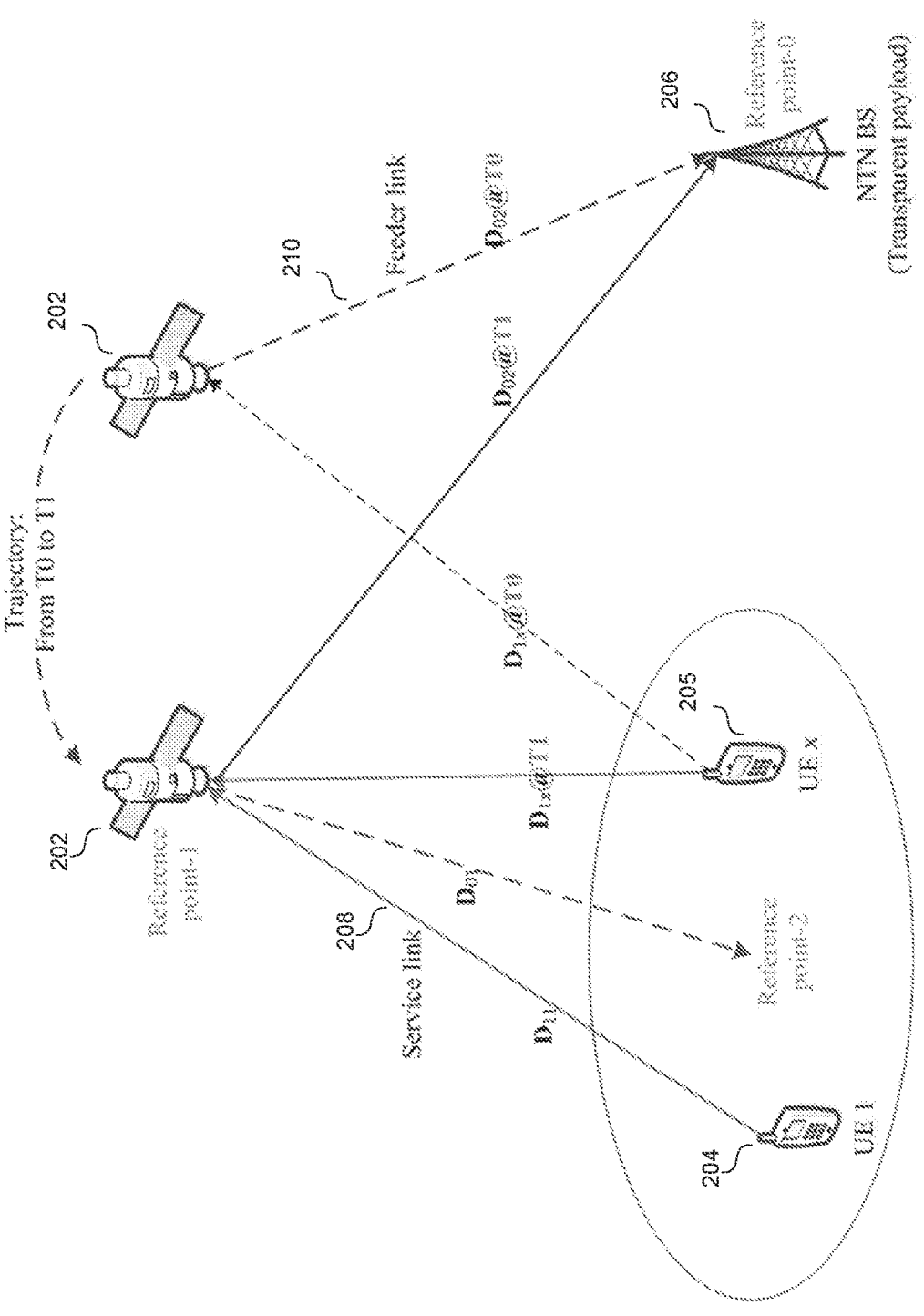
FIG. 2 shows an example non-terrestrial network.

FIG. 2 shows an example non-terrestrial network (NTN). The network includes a satellite 202 and UEs 204 and 205 that are in communication with the satellite 202 via a wireless service link 210. The satellite 202 can be communicatively connected with a base station 206 via a feeder link 210. The base station 206 can be communicatively connected with a core wireless network such as a 5G core network.

The non-terrestrial network (NTN) allows base stations (BS) and wireless devices (e.g., UEs) to communicate with each other using satellite transponders. However, the propagation delay and the Doppler effect can affect the signals between satellites and devices on earth due to the high mobility and altitude of the satellites. In order to reduce negative impacts on an uplink (UL) synchronization caused by the propagation delay and the Doppler effect, a pre-compensation can be performed to compensate for such negative impacts.

The pre-compensation is performed based on assistance information provided by a network. Due to the high mobility of satellites, however, the assistance information is only valid during a limited period of time. Therefore, in performing the pre-compensation for UL synchronization, UE needs to know the valid time period of the assistance to avoid losing synchronization by using expired information. The assistance information includes at least one of common timing advance (TA), satellite ephemeris, and position and velocity of an aerial vehicle. In this regard, the disclosed technology can be implemented in some embodiments to provide methods, systems, and devices for indicating a valid time period for assistance information.

As shown in FIG. 2, the satellite 202 can move across a trajectory from T0 to T1. Due to the high mobility of the satellite 202, there can be various delays in the feeder link 210, and the feeder link delay is common to all UEs within the same cell.

Ephemeris

In the current 3GPP discussion, it is assumed that UE has Global Navigation Satellite Systems (GNSS) capability and is able to obtain its own location. Once UE obtains the satellite ephemeris (e.g., position and velocity of satellite), it is possible to estimate the delay and Doppler of a service link to perform a pre-compensation. Therefore, the ephemeris of satellites needs to be indicated to UE as assistance information for UL synchronization.

Common TA

The position of a ground BS is generally not known to UE. Therefore, UE cannot estimate a timing advance (TA) corresponding to the feeder link. As a result, BS indicates the common TA (and additionally a common TA drift rate for a high-mobility satellite) corresponding to the feeder link to UE, which will be utilized as assistance information for UL synchronization.

Broadcast of Ephemeris and Common TA

Since ephemeris and common TA are common to UEs within the same beam and need to be obtained before accessing the network, they can be broadcast in a system information block (SIB). In order to reduce an access delay, the broadcast period of SIB should be short enough (e.g., several seconds). However, from the high layer perspective, it is not preferable to update parameters too often. Therefore, the network can broadcast the same information for multiple times using multiple SIBs, thereby reducing the access delay while increasing the update period at the same time. Here, the assistance information should be valid while the corresponding SIBs are being broadcast.

Embodiment 1: Indication of Valid Time

The common TA and ephemeris are both required for a pre-compensation and should be broadcast, e.g., in one or more SIBs. The valid time can be broadcast along with the assistance information as discussed below.

Case 1: Broadcast the Absolute Beginning Time Instant and Ending Time Instant of a Valid Time Period of Assistance Information In some implementations, absolute values for indicating time instants are provided to UEs to indicate the valid time period of assistance information. For example, absolute values such as a beginning time instant and an ending time instant are broadcast in each SIB along with the assistance information (e.g., common TA or ephemeris). Based the beginning time instant and ending time instant, UE can notice the valid time period during which the received information is valid. In this case, the beginning and ending time instants can be freely configured, but the signaling cost is relatively large since two absolute values should be indicated as timing information.

Case 2: Broadcast the Absolute Beginning Time Instant or Ending Time Instant of a Valid Time Period Along with the Time Duration of the Valid Time Period In some implementations, one absolute value for indicating a time instant and a time duration of the valid time period are provided to UEs to indicate the valid time period of assistance information. For example, only one absolute value is indicated as timing information for a valid time period of assistance information. For instance, one of the beginning time instant and ending time instant of a valid time period of assistance information and the time duration or offset value of the valid time period are indicated to UE, and UE can derive the other of the beginning time instant and ending time instant of a valid time period of assistance information based on the one of the beginning time instant and ending time instant of a valid time period of assistance information and the time duration of the valid time period. Since the range of the time duration or offset value is generally smaller than the beginning time instant and ending time instant of a valid time period of assistance information, the signaling cost is lower than Case 1. In some implementations, as the time duration of the valid time period, coarser granularity such as slot, subframe, second, SIB period, or any other predefined interval can be used instead of the granularity of time instant to reduce the number of bits needed to indicate the time duration of the valid time period.

Case 3: Broadcast the Beginning and Ending SIB ID

In some implementations, beginning and ending SIB IDs are provided to UEs to indicate the valid time period of assistance information. For example, sequential IDs are allocated to SIBs that include the same information, and the IDs of the first and last SIB, among the SIBs with current assistance information, are provided to UE, or one of the IDs of the first and last SIB and the number of SIBs that include the same information are provided UE. In this case, the beginning time instant can be derived from the beginning/ending boundary of slots/subframes that include the first SIB. Similarly, the ending time instant can be implicitly indicated by the boundary of the last SIB. Since the period of SIB is known to UE, UE can derive the offset between the received SIB and the first or last SIB based on ID difference. In this way, the valid time period and the current time can be indicated implicitly.

Case 4: Broadcast SIB ID and Valid Time Period

In some implementations, one of the beginning and ending SIB IDs and the time duration of the valid time period is provided to UEs to indicate the valid time period of assistance information. This method is more flexible than Case 3 since the time duration of the valid time period can be set to be longer than the time it takes to broadcast the same information. For example, the time duration of the valid time period can be T, while the time duration for broadcasting the same information can be T/2. The benefit of this configuration is that there can be enough remaining valid time for UE to perform UL transmissions even when UE accesses the network based on last few SIBs that include the assistance information. If the time duration for broadcasting the same information is the same as the time duration of the valid time period, the residual valid time may not be enough for UE to complete its transmission especially in Internet of Things (IoT) over NTN system, where SIB is not received in CONNECTED mode.

In some implementations, the UL transmissions include at least one of a transmission of physical random access channel (PRACH) preambles, e.g., in an initial access, and a transmission of physical uplink shared channel (PUSCH) data, e.g., in a normal UL transmission. Other types of UL transmission, e.g., PUCCH, are not precluded.

Based on the above analysis, the beginning or ending time instant of a valid time period can be indicated through the following methods:

(1) Explicitly broadcast absolute time information in SIB, which requires that a potential clock error between UE and BS is sufficiently small.

(2) Implicitly indicate the time information by the boundary of first or last SIB that includes assistance information. In this case, the boundary of received SIB and SIB ID can be used to indicate a current time and offset to the beginning or ending time instant of the valid time period.

The time duration of the valid time period can be indicated by:

(1) Interval between the beginning and ending time instant of the valid time period.

(2) Time duration, whose granularity can be the same as that of time information, or a slot, a subframe, a SIB period, or any predefined granularity.

(3) Predefine a constant value as the time duration of the valid time period to avoid frequent broadcasting of assistance information.

Common TA and ephemeris are different types of information and their valid time periods can be indicated independently.

Embodiment 2: Transmission Restriction Based on a Remaining Valid Time Period In order to avoid loss of synchronization, the UL transmission should be within the valid time period of the applied assistance information. Therefore, the transmission from UE can be postponed or cancelled if the remaining valid time period for the assistance information is less than or equal to a threshold.

Case 1: Transmission Restriction in Initial Access

In IoT over NTN system, UE is not expected to receive SIB in CONNECTED mode. Therefore, UE cannot obtain updated assistance information (e.g., updated common TA and ephemeris) by broadcasting SIB during a transmission. Hence, the whole UL transmission should be within the valid time period of the received assistance information in IDLE mode (i.e., the last information received before accessing the network by UE). As discussed above (e.g., Embodiment 1), multiple SIBs that include the same information will be broadcast sequentially. If UE begins to access the network at the last few SIBs, the residual valid time duration may not be long enough for UE to complete UL transmission. In order to avoid a potential incomplete UL transmission, an access restriction mechanism can be applied. For example, each UE is configured with a valid time threshold. Once UE finds that the residual valid time duration of current assistance information is shorter than the threshold (i.e., there is not enough time to complete the transmission), the restriction mechanism is triggered.

In some implementations, UE will stop accessing the network if the residual valid time is shorter than the configured threshold. It will try to access network, i.e., send PRACH preamble, after receiving a SIB containing new assistance information.

In some implementations, UE will send multiple PRACH preambles to handle issues that occur due to an insufficient valid time for the current assistance information. In this example, UE will still send a PRACH preamble when the residual valid time is shorter than the configured threshold. It will also additionally send a PRACH preamble after receiving a SIB containing new assistance information. Compared to the previous example, there is less modification on the traditional mechanism since UE is not restricted from accessing the network in a certain time.

Case 2: Transmission Restriction in Normal UL Transmission

In NR over NTN system, UE is able to receive SIB, i.e., update assistance information, in CONNECTED mode. The whole UL transmission is not needed to be within the valid time of same assistance information. However, once the valid time duration is a non-integral multiple of SIB period, it is still possible to lose synchronization due to the insufficient valid time. In this case, UE will postpone or cancel the UL transmission if the residual valid time is shorter than the configured threshold until a SIB containing new assistance information is received.

Different UEs may have different valid time threshold values since their transmission durations may vary. The valid time threshold values may be determined based on both the parameters of the network side and UE side. The threshold value may be obtained through at least one of following methods:

(1) The threshold is considered as part of the validity parameter and indicated along with a valid time.

(2) The threshold is calculated or predefined at UE side based on UE capability, e.g., how long the UL transmission duration is.

(3) The threshold is estimated by UE according to both information indicated by the network and information associated with UE. For example, UE may roughly estimate the variation of assistance information error range along with time. Then UE may determine a suitable threshold based on both the error range and its capability.

Embodiment 3: UE Specific Update of Assistance Information

As discussed above (e.g., Embodiment 2), if UE accesses the network based on last few SIBs transmitting same assistance information, the residual valid time period may not be enough for UL transmission since SIB reception is not expected in CONNECTED mode in NB-IoT. In addition to the methods in Case 4 of Embodiment 1 and Embodiment 2, the disclosed technology can be implemented in some embodiments to provide UE specific update of assistance information. In this method, UE will still access the network based on last few SIBs near the end of the valid time period. During the CONNECTED mode, BS can indicate updated assistance information to UE via RRC signaling. As a result, the assistance information can be updated even if SIB is not received. UL synchronization can be maintained during the entire period of the CONNECTED mode. Since the access restriction in Embodiment 2 can be avoided, this method can reduce the access latency and avoid the waste of SIB broadcasting, while UE specific signaling may require a higher signaling overhead.

The disclosed technology can be implemented in some embodiments to avoid losing synchronization in UL transmissions by indicating a valid time period for assistance information.

In some implementations, the access to the network can be restricted based on a remaining time duration of the valid time period, thereby avoiding loss of synchronization in CONNECTED mode.

In some implementations, UE specific update of assistance information allows UE to avoid loss of synchronization in CONNECTED mode.

FIG. 3 shows an example of a wireless communication method based on some embodiments of the disclosed technology.

In some embodiments of the disclosed technology, a wireless communication method 300 includes, at 310, receiving, by a wireless device, a set of parameters to indicate a validity of assistance information, wherein the assistance information is used to perform a synchronization for transmissions from the wireless device to the network device. Here, the wireless device can include UE. The set of parameters can include any parameter that is used to indicate a valid time of the assistance information as discussed, for example, in Embodiment 1.

FIG. 6 shows an example of a wireless communication method that includes receiving, by a wireless device, from a network device, assistance information for performing a synchronization for transmissions from the wireless device to the network device and a set of parameters to indicate a validity of the assistance information and a valid time period of the assistance information; and performing the transmissions to the network device in a case that a remaining time period of the valid time period of the assistance information is greater than or equal to a threshold valid time period; or postponing or canceling the transmissions to the network device in a case that the remaining time period of the valid time period of the assistance information is less than the threshold valid time period, wherein the remaining time is determined as a difference between an end time of the valid time period of the assistance information and a current time, wherein the threshold valid time period is determined based on information associated with the wireless device.

FIG. 7 shows another example of a wireless communication method that includes transmitting, by a network device, to a wireless device, assistance information for performing a synchronization for transmissions from the wireless device to the network device and a set of parameters to indicate a validity of the assistance information and a valid time period of the assistance information, wherein the transmissions from the wireless device are performed in a case that a remaining time period of the valid time period of the assistance information is greater than or equal to a threshold valid time period, or the transmissions from the wireless device are postponed or canceled in a case that the remaining time period of the valid time period of the assistance information is less than the threshold valid time period, wherein the remaining time is determined as a difference between an end time of the valid time period of the assistance information and a current time, wherein the threshold valid time period is determined based on information associated with the wireless device.

Figure 4:
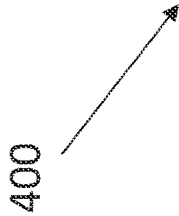
FIG. 4 shows another example of a wireless communication method based on some embodiments of the disclosed technology.

FIG. 4 shows another example of a wireless communication method based on some embodiments of the disclosed technology.

In some embodiments of the disclosed technology, a wireless communication method 400 includes, at 410, transmitting, by a network device, a set of parameters to indicate a validity of assistance information, wherein the assistance information is used to perform a synchronization for transmissions to the network device. Here, the set of parameters can include any parameter that is used to indicate a valid time of the assistance information as discussed in Embodiment 1.

Figure 5:
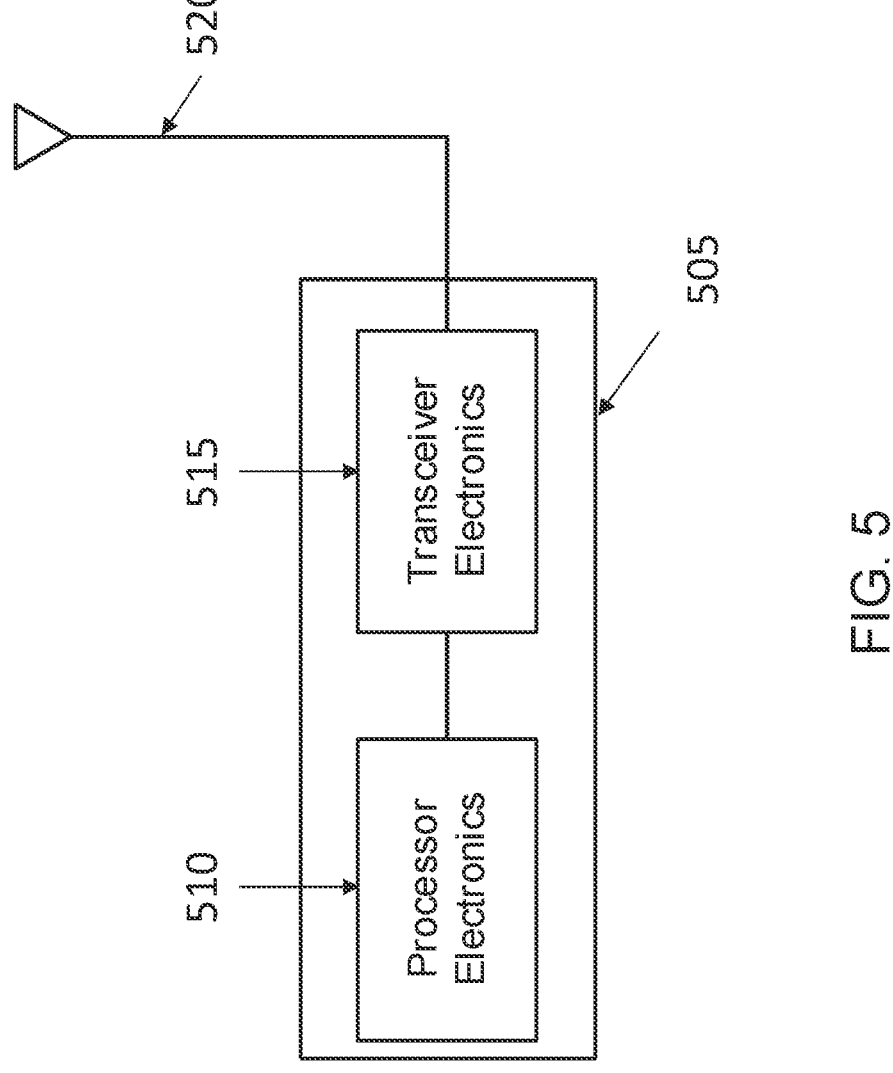
FIG. 5 is a block diagram representation of a portion of an apparatus that can be used to implement methods and/or techniques of the presently disclosed technology.

FIG. 5 is a block diagram representation of a portion of an apparatus, in accordance with some embodiments of the presently disclosed technology. An apparatus 505 such as a network device or a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication (e.g., method 300 depicted in FIG. 3), comprising: receiving (310), by a wireless device, a set of parameters to indicate a validity of assistance information, wherein the assistance information is used to perform a synchronization for transmissions from the wireless device to a network device. Here, the wireless device can include UE. The set of parameters can include any parameter that is used to indicate a valid time of the assistance information as discussed in Embodiment 1.

Clause 2. The method of clause 1, wherein the synchronization for transmission includes a pre-compensation for at least one of a propagation delay or frequency offset.

Clause 3. The method of clause 1, wherein the set of parameters are received along with the assistance information.

Clause 4. The method of clause 1, wherein the assistance information is received via a series of system information blocks (SIBs).

Clause 5. The method of clause 1, wherein the set of parameters includes a begin time instant and an end time instant of a valid time period of the assistance information. For instance, as discussed in Case 1 of Embodiment 1, a begin time instant and an end time instant of a valid time period of the assistance information can be broadcast in each SIB along with the assistance information (e.g., common TA or ephemeris).

Clause 6. The method of clause 1, wherein the set of parameters includes one of a begin time instant or an end time instant of a valid time period of the assistance information and a time duration of a valid time period of the assistance information. For instance, as discussed in Case 2 of Embodiment 1, a time instant (e.g., beginning time instant or ending time instant) and a time duration of the valid time period are provided to UEs to indicate the valid time period of assistance information.

Clause 7. The method of clause 1, wherein the set of parameters includes identifiers of an initial SIB and a final SIB of the series of SIBs that include the assistance information. For instance, as discussed in Case 3 of Embodiment 1, the beginning and ending SIB IDs can be provided to UEs to indicate the valid time period of assistance information.

Clause 8. The method of clause 1, wherein the set of parameters includes an identifier of an initial SIB or a final SIB of the series of SIBs that include the assistance information and a time duration of a valid time period of the assistance information. For instance, as discussed in Case 4 of Embodiment 1, one of the beginning and ending SIB IDs and the time duration of the valid time period can be provided to UEs to indicate the valid time period of assistance information.

Clause 9. The method of any of clauses 7-8, wherein a begin time instant of a valid time period of the assistance information is determined based on boundaries of slots or subframes that include the initial SIB, and an end time instant of a valid time period of the assistance information is determined based on boundaries of slots or subframes that include the final SIB.

Clause 10. The method of any of clauses 6-9, wherein the time duration is indicated by at least one of a granularity of epoch time, a period of SIB broadcast, or a predefined granularity.

Clause 11. The method of any of clauses 1-10, wherein the wireless device performs the transmissions to the network device in a case that a remaining valid time period for the assistance information is greater than or equal to a threshold valid time period. For instance, as discussed in Embodiment 2, the transmission from UE can be postponed or cancelled based on a comparison between the remaining valid time period for the assistance information and a threshold.

Clause 12. The method of any of clauses 1-10, wherein the wireless device postpones or cancels the transmissions to the network device in a case that a remaining valid time period for the assistance information is less than a threshold valid time period.

Clause 13. The method of any of clauses 1-10, wherein the wireless device postpones transmitting a physical random access channel (PRACH) preamble to the network device in a case that a remaining valid time period for the assistance information is less than a threshold valid time period after receiving a SIB containing new assistance information. For instance, as discussed in Case 1 of Embodiment 2, UE will stop accessing the network if the residual valid time is shorter than the configured threshold. UE will try to access the network, e.g., by sending PRACH preamble, after receiving a SIB containing new assistance information.

Clause 14. The method of any of clauses 1-10, wherein the wireless device transmits multiple PRACH preambles to the network device in a case that a remaining valid time period for the assistance information is less than a threshold valid time period. For instance, as discussed in Case 1 of Embodiment 2, UE will send multiple PRACH preambles to handle issues that occur due to an insufficient valid time for the current assistance information. In this example, UE will still send a PRACH preamble when the residual valid time is shorter than the configured threshold.

Clause 15. The method of clause 14, wherein the wireless device transmits at least one of the multiple PRACH preambles after receiving a SIB containing new assistance information.

Clause 16. The method of any of clauses 11-15, wherein the threshold valid time period is wireless device specific.

Clause 17. The method of any of clauses 11-15, wherein the set of parameters includes the threshold valid time period.

Clause 18. The method of any of clauses 11-15, wherein the threshold valid time period is determined based on information associated with the wireless device.

Clause 19. The method of any of clauses 11-15, wherein the threshold valid time period is determined based on information indicated by the network device and information associated with the wireless device.

Clause 20. The method of any of clauses 1-19, further comprising receiving, by the wireless device, updated assistance information for performing the synchronization for transmissions to the network device, in a case that the assistance information received by the wireless device during an idle mode via the series of SIBs is expired.

Clause 21. The method of clause 20, wherein the wireless device receives the updated assistance information during a connected mode by a radio resource control (RRC) signaling (e.g., Embodiment 3).

Clause 22. A method of wireless communication (e.g., method 400 depicted in FIG. 4), comprising: transmitting (410), by a network device, a set of parameters to indicate a validity of assistance information, wherein the assistance information is used to perform a synchronization for transmissions to the network device. The set of parameters can include any parameter that is used to indicate a valid time of the assistance information as discussed in Embodiment 1.

Clause 23. The method of clause 22, wherein the synchronization for transmissions to the network device includes a pre-compensation for at least one of a propagation delay or frequency offset.

Clause 24. The method of clause 22, wherein the set of parameters are transmitted along with the assistance information.

Clause 25. The method of clause 22, wherein the assistance information is received via a series of system information blocks (SIBs).

Clause 26. The method of clause 22, wherein the set of parameters includes a begin time instant and an end time instant of a valid time period of the assistance information. For instance, as discussed in Case 1 of Embodiment 1, a begin time instant and an end time instant of a valid time period of the assistance information can be broadcast in each SIB along with the assistance information (e.g., common TA or ephemeris).

Clause 27. The method of clause 22, wherein the set of parameters includes one of a begin time instant or an end time instant of a valid time period of the assistance information and a time duration of a valid time period of the assistance information. For instance, as discussed in Case 2 of Embodiment 1, a time instant (e.g., beginning time instant or ending time instant) and a time duration of the valid time period are provided to UEs to indicate the valid time period of assistance information.

Clause 28. The method of clause 22, wherein the set of parameters includes identifiers of an initial SIB and a final SIB of the series of SIBs that include the assistance information. For instance, as discussed in Case 3 of Embodiment 1, the beginning and ending SIB IDs can be provided to UEs to indicate the valid time period of assistance information.

Clause 29. The method of clause 22, wherein the set of parameters includes an identifier of an initial SIB or a final SIB of the series of SIBs that include the assistance information and a time duration of a valid time period of the assistance information. For instance, as discussed in Case 4 of Embodiment 1, one of the beginning and ending SIB IDs and the time duration of the valid time period can be provided to UEs to indicate the valid time period of assistance information.

Clause 30. The method of any of clauses 28-29, wherein a begin time instant of a valid time period of the assistance information is determined based on boundaries of slots or subframes that include the initial SIB, and an end time instant of a valid time period of the assistance information is determined based on boundaries of slots or subframes that include the final SIB.

Clause 31. The method of any of clauses 27-30, wherein the time duration is indicated by at least one of a granularity of epoch time, a period of SIB broadcast, or a predefined granularity.

Clause 32. The method of any of clauses 22-31, wherein one or more transmissions from one or more wireless devices are performed in a case that a remaining valid time period for the assistance information is greater than or equal to a threshold valid time period. For instance, as discussed in Embodiment 2, the transmission from UE can be postponed or cancelled based on a comparison between the remaining valid time period for the assistance information and a threshold.

Clause 33. The method of any of clauses 22-31, wherein one or more transmissions from one or more wireless devices are postponed or canceled in a case that a remaining valid time period for the assistance information is less than a threshold valid time period.

Clause 34. The method of any of clauses 22-31, wherein the sending of PRACH preambles from one or more wireless devices are postponed in a case that a remaining valid time period for the assistance information is less than a threshold valid time period after a SIB containing new assistance information is indicated. For instance, as discussed in Case 1 of Embodiment 2, UE will stop accessing the network if the residual valid time is shorter than the configured threshold. UE will try to access the network, e.g., by sending PRACH preamble, after receiving a SIB containing new assistance information.

Clause 35. The method of any of clauses 22-31, wherein multiple PRACH preambles are sent by one or more wireless devices in a case that a remaining valid time period for the assistance information is less than a threshold valid time period. For instance, as discussed in Case 1 of Embodiment 2, UE will send multiple PRACH preambles to handle issues that occur due to an insufficient valid time for the current assistance information. In this example, UE will still send a PRACH preamble when the residual valid time is shorter than the configured threshold.

Clause 36. The method of clause 35, wherein at least one of the multiple PRACH preambles is sent after the one or more wireless devices receiving a SIB containing new assistance information.

Clause 37. The method of any of clauses 32-36, wherein the threshold valid time period is wireless device specific.

Clause 38. The method of any of clauses 32-36, wherein the set of parameters includes the threshold valid time period.

Clause 39. The method of any of clauses 32-36, wherein the threshold valid time period is determined based on information associated with the wireless device.

Clause 40. The method of any of clauses 32-36, wherein the threshold valid time period is determined based on information indicated by the network device and information associated with the wireless device.

Clause 41. The method of any of clauses 22-40, further comprising transmitting, by the network device, updated assistance information for performing the synchronization for transmissions to the network device, in a case that the assistance information received by one or more wireless devices during an idle mode via the series of SIBs is expired.

Clause 42. The method of clause 41, wherein the updated assistance information is transmitted during a connected mode by a radio resource control (RRC) signaling (e.g., Embodiment 3).

Clause 43. The method of any of clauses 1-42, wherein the assistance information includes at least one of a satellite ephemeris, a common timing advance (TA), and position and velocity information of an aerial vehicle.

Clause 44. The method of any of clauses 1-42, wherein the network device transmits a common timing advance (TA) to a plurality of network devices.

Clause 45. An apparatus for wireless communication, comprising a processor, wherein the processor is configured to implement a method recited in any of clauses 1 to 44.

Clause 46. A computer readable program storage medium having code stored thereon, the code, when executed by a processor, causing the processor to implement a method recited in any of clauses 1 to 44.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method of wireless communication, comprising:
   receiving, by a wireless device, from a network device, assistance information for performing a synchronization for transmissions from the wireless device to the network device and a set of parameters to indicate a validity of the assistance information and a valid time period of the assistance information; and
   performing the transmissions to the network device in a case that a remaining time period of the valid time period of the assistance information is greater than a threshold valid time period; or
   postponing or canceling the transmissions to the network device in a case that the remaining time period of the valid time period of the assistance information is less than or equal to the threshold valid time period,
   wherein the remaining time is determined as a difference between an end time of the valid time period of the assistance information and a current time,
   wherein the threshold valid time period is configured by the network device or is determined or predefined at the wireless device.

2. The method of claim 1, wherein the synchronization for transmission includes a pre-compensation for at least one of a propagation delay or frequency offset.

3. The method of claim 1, wherein the set of parameters includes at least one of a begin time instant of the valid time period of the assistance information, an end time instant of the valid time period of the assistance information, or a time duration of the valid time period of the assistance information.

4. The method of claim 1, wherein the assistance information is received via a series of system information blocks (SIBs).

5. The method of claim 4, wherein the set of parameters includes identifiers of at least one of an initial SIB of the series of SIBs that include the assistance information, a final SIB of the series of SIBs that include the assistance information, or a time duration of the valid time period of the assistance information.

6. The method of claim 5, wherein a begin time instant of a valid time period of the assistance information is determined based on boundaries of slots or subframes that include the initial SIB, and an end time instant of a valid time period of the assistance information is determined based on boundaries of slots or subframes that include the final SIB.

7. The method of claim 4, further comprising:
   receiving, by the wireless device, from the network device, updated assistance information for performing the synchronization for transmissions to the network device, in a case that the assistance information received by the wireless device during an idle mode via the series of SIBs is expired.

8. The method of claim 7, wherein the wireless device receives the updated assistance information during a connected mode by a radio resource control (RRC) signaling.

9. The method of claim 1, wherein the wireless device postpones transmitting a physical random access channel (PRACH) preamble to the network device in a case that the remaining valid time period for the assistance information is less than a threshold valid time period after receiving a system information blocks (SIB) containing new assistance information.

10. The method of claim 1, wherein the wireless device transmits multiple physical random access channel (PRACH) preambles to the network device in a case that the remaining valid time period for the assistance information is less than a threshold valid time period.

11. The method of claim 10, wherein the wireless device transmits at least one of the multiple PRACH preambles after receiving a SIB containing new assistance information.

12. The method of claim 1, wherein the assistance information includes at least one of a satellite ephemeris, a common timing advance (TA), and position and velocity information of an aerial vehicle.

13. A method of wireless communication, comprising:
    transmitting, by a network device, to a wireless device, assistance information for performing a synchronization for transmissions from the wireless device to the network device and a set of parameters to indicate a validity of the assistance information and a valid time period of the assistance information,
    wherein the transmissions from the wireless device are performed in a case that a remaining time period of the valid time period of the assistance information is greater than a threshold valid time period, or the transmissions from the wireless device are postponed or canceled in a case that the remaining time period of the valid time period of the assistance information is less than or equal to the threshold valid time period,
    wherein the remaining time is determined as a difference between an end time of the valid time period of the assistance information and a current time,
    wherein the threshold valid time period is configured by the network device or is determined or predefined at the wireless device.

14. The method of claim 13, wherein the synchronization for transmissions to the network device includes a pre-compensation for at least one of a propagation delay or frequency offset.

15. The method of claim 13, wherein the set of parameters includes at least one of a begin time instant of the valid time period of the assistance information, an end time instant of the valid time period of the assistance information, or a time duration of the valid time period of the assistance information.

16. The method of claim 13, wherein the assistance information is transmitted via a series of system information blocks (SIBs).

17. The method of claim 16, wherein the set of parameters includes identifiers of at least one of an initial SIB of the series of SIBs that include the assistance information, a final SIB of the series of SIBs that include the assistance information, or a time duration of the valid time period of the assistance information.

18. The method of claim 17, wherein a begin time instant of a valid time period of the assistance information is determined based on boundaries of slots or subframes that include the initial SIB, and an end time instant of a valid time period of the assistance information is determined based on boundaries of slots or subframes that include the final SIB.

19. The method of claim 16, further comprising:

transmitting, by the network device, to the wireless device, updated assistance information for performing the synchronization for transmissions to the network device, in a case that the assistance information received by one or more wireless devices during an idle mode via the series of SIBs is expired.

20. The method of claim 19, wherein the updated assistance information is transmitted during a connected mode by a radio resource control (RRC) signaling.

\* \* \* \* \*